(12) United States Patent
Köhler et al.

(10) Patent No.: US 10,000,586 B2
(45) Date of Patent: Jun. 19, 2018

(54) METHOD FOR PRODUCING POLYVINYL ALCOHOL

(71) Applicant: WACKER CHEMIE AG, München (DE)

(72) Inventors: Thomas Köhler, Allentown, PA (US); Martina Belitzer, Garching (DE); Oliver Windt, Hochburg-Ach (AT)

(73) Assignee: Wacker Chemie AG, Munich (DE)

( * ) Notice: Subject to any disclaimer, the term of this patent is extended or adjusted under 35 U.S.C. 154(b) by 0 days. days.

(21) Appl. No.: 15/101,142

(22) PCT Filed: Dec. 4, 2014

(86) PCT No.: PCT/EP2014/076632
§ 371 (c)(1),
(2) Date: Jun. 2, 2016

(87) PCT Pub. No.: WO2015/082641
PCT Pub. Date: Jun. 11, 2015

(65) Prior Publication Data
US 2016/0304632 A1    Oct. 20, 2016

(30) Foreign Application Priority Data
Dec. 6, 2013 (DE) .................. 10 2013 225 178

(51) Int. Cl.
    *C08F 8/12* (2006.01)
(52) U.S. Cl.
    CPC ..................................... *C08F 8/12* (2013.01)
(58) Field of Classification Search
    CPC ........................................................ C08F 8/12
    See application file for complete search history.

(56) References Cited

U.S. PATENT DOCUMENTS

| | | |
|---|---|---|
| 2,227,997 A | 1/1941 | Berg |
| 2,642,419 A | 6/1953 | Waugh et al. |
| 2,643,994 A | 6/1953 | Germain |
| 3,072,624 A | 1/1963 | Akaboshi et al. |
| 3,278,505 A | 10/1966 | Kominami |
| 3,487,060 A | 12/1969 | Bristol |
| 3,547,858 A | 12/1970 | Worrall |
| 3,884,892 A | 5/1975 | Winkler et al. |
| 4,401,790 A | 8/1983 | Jung et al. |
| 2002/0151660 A1 | 10/2002 | Bauer et al. |
| 2006/0142499 A1* | 6/2006 | Guntherberg ............ C08F 8/12 525/242 |
| 2008/0255310 A1* | 10/2008 | Tsou ..................... C08L 21/00 525/178 |

FOREIGN PATENT DOCUMENTS

| | | |
|---|---|---|
| DE | 2251603 A | 4/1974 |
| DE | 2304684 A | 8/1974 |
| DE | 3000750 A1 | 7/1981 |
| DE | 10242416 B4 | 3/2004 |
| EP | 0044027 A1 | 1/1982 |
| EP | 0054716 A2 | 6/1982 |
| EP | 1231221 A1 | 8/2002 |
| EP | 1674485 A1 | 6/2006 |
| GB | 848787 A | 9/1960 |
| GB | 862488 A | 3/1961 |
| GB | 1422027 A | 1/1976 |
| KR | 20070058083 A | 6/2007 |

OTHER PUBLICATIONS

English patent abstract for KR 20070058083 A.
English patent abstract for DE 3000750 C2.
English patent abstract for DE 10242416 B4.
E. Meehan, S.P. Reid, E. Samios, J.V. Dawkins, Macromol. Symp. 110, 65-80 (1996).
J.V. Dawkins, T.A. Nicholson, A.J. Handley, E.Meehan, A.Nevin, P.L. Shaw, Polymer 40, 7331-7339 (1999).

* cited by examiner

*Primary Examiner* — Jeffrey C Mullis
(74) *Attorney, Agent, or Firm* — RatnerPrestia

(57) ABSTRACT

A method for producing polyvinyl alcohols by means of catalytic reactions of alcoholic polyvinyl ester solutions in extruders, wherein the polyvinyl esters are based exclusively on ethylenically unsaturated monomers and wherein one or more neutralizing agents are added to the product of the catalytic reaction.

13 Claims, 1 Drawing Sheet

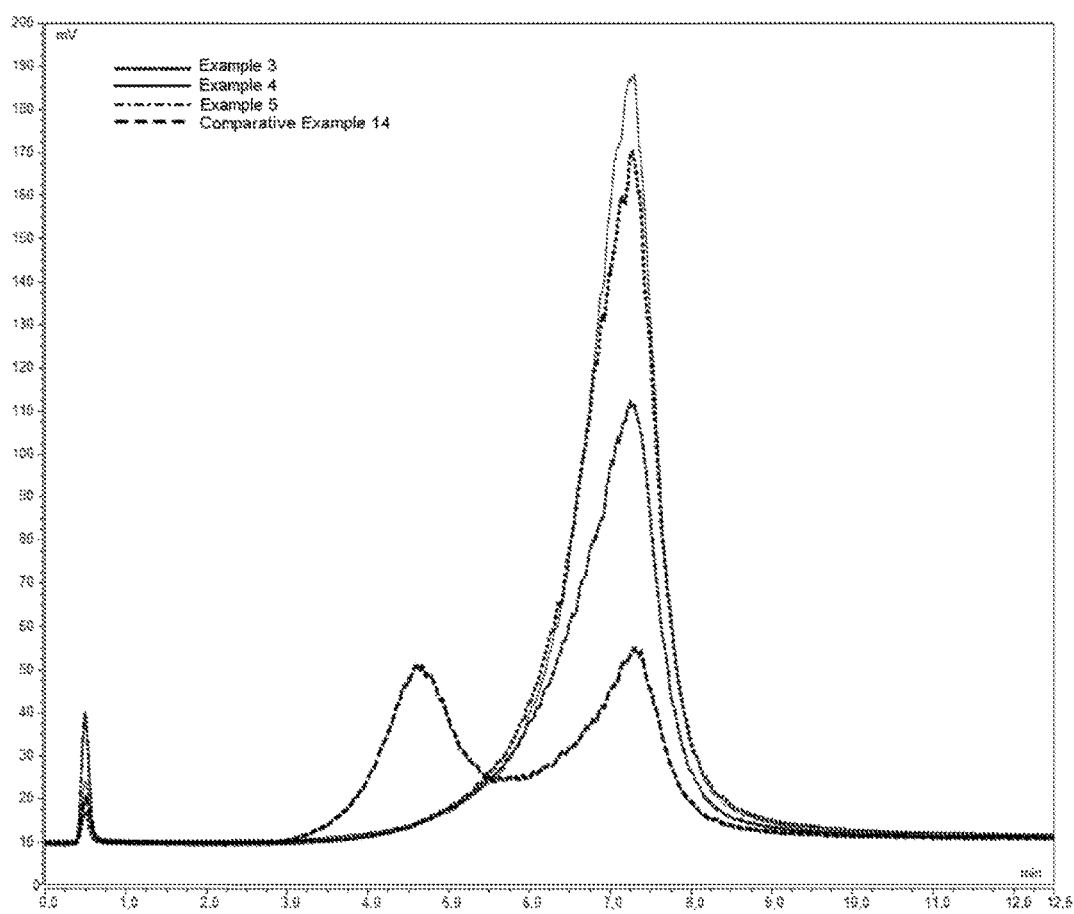

METHOD FOR PRODUCING POLYVINYL ALCOHOL

CROSS-REFERENCE TO RELATED APPLICATIONS

This application is the U.S. National stage filing of International Application No. PCT/EP2014/076632, filed 4 Dec. 2014, and claims priority of German application number 10 2013 225 178.5, filed 6 Dec. 2013.

FIELD OF THE INVENTION

The invention relates to methods for producing polyvinyl alcohol by means of catalytic reaction of alcoholic polyvinyl ester solutions in extruders.

Polyvinyl alcohol (PVAL) is generally produced by esterification of polyvinyl esters with alcohols, such as methanol or ethanol. The polyvinyl esters are obtainable by radical polymerization of vinyl esters, that is to say of esters of aliphatic carboxylic acids, such as vinyl acetate or vinyl propionate. The transesterification can be carried out with basic or acidic catalysis. The resulting polyvinyl alcohols are conventionally characterized by their degree of hydrolysis and their viscosity in a 4% by weight aqueous solution.

Instead of the degree of hydrolysis, there is frequently also indicated the so-called saponification number, which denotes the amount of potassium hydroxide (KOH) in milligrams per gram of PVAL which is necessary for complete cleavage of all the remaining ester groups. The saponification number is thus a measure of the number of ester groups present in all the polymer molecules of a sample. Where the same macroscopic saponification numbers are found, significantly different distributions of the saponification numbers over the number of polymer molecules can occur. The individual polymer molecules can have approximately the same degree of hydrolysis (narrow saponification number distribution) or can be characterized by very different degrees of hydrolysis (broad saponification number distribution).

Depending on the production method, there are nevertheless significant differences in the structure of the polyvinyl alcohols for the same saponification number and viscosity. On the one hand, the remaining ester groupings can be arranged differently, either combined in larger blocks or distributed randomly. When basic catalysts are used, blocky polyvinyl alcohols tend to be obtained, while the use of acidic catalysts tends to yield polyvinyl alcohols in which the remaining ester groups are distributed randomly. Additions of other solvents, for example water, also influence the distribution of the ester groups in the polyvinyl alcohol.

Discontinuous processes for transesterification in kneaders, which are described, for example, in DE 3000750, DE 0763840, DE 10242416 or EP 1231221, have been known for a long time. In those processes, highly concentrated, generally methanolic polyvinyl acetate solutions are mixed with the transesterification catalyst. The gel that forms is continually comminuted during the reaction. After termination of the reaction, methanol and methyl acetate that have formed are distilled off in the kneader. Large amounts of polyvinyl alcohol can be produced inexpensively by such processes only with difficulty. Polyvinyl alcohols having very broad saponification number distributions and high blockiness are typically obtained by kneader processes.

A discontinuous process which may be mentioned is the transesterification of polyvinyl acetate to polyvinyl alcohol in a normal stirred vessel, as described, for example, in DE 2304684 or GB 862488. In this process, dilute, generally methanolic polyvinyl acetate solutions are mixed with catalyst. The gel is comminuted by continuous stirring, and a very finely divided suspension of polyvinyl alcohol in methanol/methyl acetate is formed. However, such finely divided suspensions are difficult to filter, so that the production of solid polyvinyl alcohol by this method is not economical. Moreover, large amounts of solvent must be distilled off from the stirred vessel and fed to working-up by distillation. This repeated distillation is a time- and energy-intensive process. In addition, a plurality of distillation columns is required for separating methyl acetate and methanol.

A further established process for producing polyvinyl alcohol is the so-called belt process, which is known, for example, from U.S. Pat. No. 3,278,505, U.S. Pat. No. 2,643,994, U.S. Pat. No. 2,642,419 or DE-A 2251603. In this process, alkaline solution is mixed rapidly and intensively with the generally methanolic polyvinyl acetate solution and applied to a moving belt. The mixture solidifies to form a gel, which is broken and cut at the end of the belt. The granules so produced are generally neutralized with acetic acid and washed with methanol. This process disadvantageously also yields polyvinyl alcohol having inhomogeneous degrees of saponification and broad saponification number distributions. In addition, the process is economical only when large amounts of polyvinyl alcohol are produced and is thus less suitable for the introduction of innovative, novel products in quantities which, at the start of production, are small.

A further continuous process is the suspension transesterification of polyvinyl acetate, as described, for example, in U.S. Pat. No. 3,487,060. In this process, the polyvinyl acetate solution and the catalyst solution are added continuously to an agitated alcoholysis mixture, and a suspension of polyvinyl alcohol in methanol and methyl acetate is removed continuously from the alcoholysis mixture. Gel formation can largely be avoided by suitable process management. In comparison with the other continuous processes, the costs of acquiring the reaction equipment are very low. However, it is difficult to maintain a specific degree of hydrolysis. DE-A 1086893 describes a continuous process in which the alkaline alcohol solution of the polyvinyl ester is passed through a tube, wherein a solid mass forms, which is removed from the tube by means of rollers.

Also known are a number of extruder processes, in which acidic or alkaline alcohol solutions of polyvinyl esters are guided through extruders. The gel formed during the hydrolysis is thereby comminuted in the extruder, as described, for example, in U.S. Pat. No. 3,072,624 or U.S. Pat. No. 3,547,858. The addition of a neutralizing agent to the saponification product is not mentioned in those specifications, however. In this respect, EP0044027 teaches discharging the hydrolysis products from the extruder and then, after they have cooled to room temperature, neutralizing them by adding an acid. Analogously, EP0054716 recommends transferring the saponification products from the extruder into a tank and neutralizing them therein by adding an acid. EP1674485 uses an extruder for saponifying special graft copolymers which comprise vinyl ester units as well as polyether units. However, the saponification products of EP1674485 are thermoplastics having a completely different property profile, in particular completely different flow properties, to polyvinyl alcohols of vinyl ester polymers derived solely from ethylenically unsaturated monomers.

SUMMARY OF THE INVENTION

Against this background, the object was to provide a more efficient method for producing polyvinyl alcohols; in particular, it should be possible to carry out the method using as little solvent as possible, and the method should also be suitable for large-scale applications. In addition, the polyvinyl alcohols obtained thereby should be suitable as a protective colloid for emulsion polymerization processes and are to have a narrow and uniform saponification number distribution, where possible, independently of the batch. Where possible, the method is also to open up a simple means of obtaining polyvinyl alcohols having very different degrees of saponification and viscosities.

Surprisingly, the object has been achieved by reacting an alcoholic solution of a polyvinyl ester in an extruder in the presence of a catalyst, in particular a transesterification catalyst, and adding neutralizing agent to the product of the transesterification, generally the transesterification product, in the extruder.

BRIEF DESCRIPTION OF THE DRAWING

The drawing shows polyvinyl alcohol saponification number distributions obtained according to the invention, compared with that obtained by prior art methods.

DETAILED DESCRIPTION OF THE INVENTION

The invention provides methods for producing polyvinyl alcohols by means of catalytic reaction of alcoholic polyvinyl ester solutions in extruders, characterized in that the polyvinyl esters are based solely on ethylenically unsaturated monomers, and one or more neutralizing agents are added to the product of the catalytic reaction in the extruder.

The alcoholic polyvinyl ester solution can comprise, for example, one or more polyvinyl esters, one or more alcoholic solvents, optionally one or more catalysts and optionally one or more additives.

Suitable alcoholic solvents for the polyvinyl esters are, for example, monohydric, aliphatic alcohols having from 1 to 6 carbon atoms or mixtures thereof, preferably methanol or ethanol, particularly preferably methanol.

Examples of additives are water, acetone, methyl acetate, pentane or benzene. Preferably, however, no additives are used.

Suitable polyvinyl esters are, for example, homopolymers or copolymers with vinyl esters of aliphatic carboxylic acids having from 1 to 13 carbon atoms, such as vinyl formate, vinyl acetate, vinyl propionate, vinyl laurate, as well as vinyl esters of alpha-branched carboxylic acids having from 9 to 13 carbon atoms, such as VeoVa 9 or VeoVa 10 (trade names of Momentive). Preferred vinyl esters are vinyl laurate, vinyl esters of alpha-branched carboxylic acids having from 9 to 13 carbon atoms, and in particular vinyl acetate. Homopolymers and copolymers of vinyl acetate are preferred. The polymers can optionally comprise up to 50% by weight comonomer units derived from further ethylenically unsaturated comonomers which are copolymerizable with vinyl esters, such as, for example, olefins such as ethylene and propylene, acrylic acid esters or methacrylic acid esters of unbranched or branched alcohols having from 1 to 22 carbon atoms, such as methyl acrylate, methyl methacrylate, n-butyl acrylate, tert-butyl acrylate or 2-ethylhexyl acrylate, or ethylenically unsaturated comonomers such as isopropenyl acetate, N-vinylpyrrolidone, N-vinylcaprolactam, vinyl formamide, as well as ethylenically unsaturated mono- and di-carboxylic acids, such as acrylic acid, methacrylic acid, crotonic acid, itaconic acid, fumaric acid, maleic acid or maleic anhydride, ethylenically unsaturated carboxylic acid amides such as acrylamide and N-methylolacrylamide, vinyl esters of alpha-branched carboxylic acids having from 9 to 13 carbon atoms, such as VeoVa 9 or VeoVa 10. Preferred comonomers are ethylene, itaconic acid, maleic acid, and in particular crotonic acid, vinyl esters of alpha-branched carboxylic acids having from 9 to 10 carbon atoms, such as VeoVa 9 or VeoVa 10, as well as isopropenyl acetate. Polyvinyl acetate is most preferred.

The polyvinyl esters used according to the invention are based solely on ethylenically unsaturated monomers. The polyvinyl esters preferably do not contain a polyether unit or a polyether group, such as polyalkylene glycol groups, and the polyvinyl esters are particularly preferably not graft copolymers. Polyalkylene glycol groups are, for example, —$(CH_2)_n$—O groups wherein n=from 1 to 5 or from 1 to 4, wherein one or more hydrogen atoms of a polyalkylene glycol group can be substituted, for example by alkyl groups having from 1 to 10 carbon atoms, such as methyl or ethyl groups.

The polyvinyl esters can be introduced into the extruder in the form of alcoholic solutions. The content of polyvinyl esters in such alcoholic solutions is preferably so chosen that the viscosity of the polyvinyl ester solution used, prior to mixing with the catalyst solution, is preferably ≤1 000 000 mPa·s, more preferably ≤100 000 mPa·s, particularly preferably ≤50 000 mPa·s and most particularly preferably ≤20 000 mPa·s (determined by means of a Brookfield viscometer, after adjustment to a temperature of 23° C., using the spindle conventionally employed in the viscosity range in question, at 20 rpm).

The content of polyvinyl ester in the alcoholic solution in which the catalytic reaction takes place is adjusted to preferably from 20 to 80% by weight, particularly preferably from 30 to 70% by weight. The formation of polyvinyl alcohol of well-balanced quality and the space-time yield of the transesterification reaction can thereby be positively influenced.

The transesterification of the polyvinyl esters, which is also referred to as the reaction of the polyvinyl esters to polyvinyl alcohols, preferably takes place in the presence of one or more acidic or alkaline catalysts. Acidic catalysts are, for example, mineral acids, such as hydrochloric acid or sulfuric acid, or organic acids, such as aliphatic or aromatic sulfonic acids. Alkaline catalysts are preferred. Examples of alkaline catalysts are hydroxides, alcoholates, in particular alcoholates having from 1 to 6 carbon atoms, and carbonates of alkali or alkaline earth metals. Preferred alcoholates are methanolates and ethanolates. The hydroxides or alcoholates of lithium, sodium, potassium or calcium are preferred; sodium hydroxide and sodium methanolate are particularly preferred.

The catalysts are generally used in the form of their aqueous or preferably alcoholic solutions and preferably dissolved in the same alcohol as is used for dissolving the polyvinyl ester. If aqueous solutions of the catalyst are used, they are preferably diluted with alcohol, particularly preferably with the same alcohol as is used for dissolving the polyvinyl ester. The content of catalyst in the alcoholic or aqueous-alcoholic solution used is preferably from 0.1 to 20% by weight and particularly preferably from 0.3 to 15% by weight. The amounts of catalyst used are generally from 0.05 to 10.0% by weight, preferably from 0.1 to 7% by weight, particularly preferably from 0.2 to 5% by weight and most preferably from 0.2 to 3% by weight, in each case based on the dry weight of the polyvinyl esters.

One or more polyvinyl esters and one or more catalysts can also be introduced into the extruder in the form of a premixture. In this case, one or more polyvinyl esters and one or more catalysts are mixed in an upstream mixing unit before they enter the extruder. The polyvinyl ester is introduced into the mixing unit preferably in the form of an alcoholic solution. The catalyst is introduced into the mixing unit preferably in the form of an aqueous solution and particularly preferably in the form of an alcoholic solution. Mixing can take place, for example, at temperatures of from 10 to 60° C., preferably from 20 to 50° C. and particularly preferably from 20 to 35° C. After the polyvinyl ester solution and the catalyst solution have been mixed, the premixture so obtained has a viscosity of preferably ≤700 000 mPa·s, particularly preferably ≤50 000 mPa·s, most preferably ≤30 000 mPa·s, and/or preferably ≥1000 mPa·s and particularly preferably ≥5000 mPa·s (determined by means of a Brookfield viscometer, after adjustment to a temperature of 23° C., using the spindle conventionally employed in the viscosity range in question, at 20 rpm).

Mixing in order to prepare the premixture comprising polyvinyl ester and catalyst can generally be carried out discontinuously or preferably continuously. Where the premixture is prepared discontinuously, the polyvinyl ester solution, for example, is placed in the upstream mixing unit, preferably in a reactor, and mixed with an aqueous solution, an aqueous solution diluted with alcohol or an alcoholic solution, of the catalyst. A homogeneous mixture is preferably obtained. The premixture so obtained is then introduced into the extruder. As is known, the mixing time is determined by the mixing time characteristic of the stirring or mixing member used in the reactor. The mixing unit can contain, for example, stirring members, such as anchor, finger paddle, propeller, impeller, MIG, pitched-blade, Alpha (Stelzer) or Sigma (Stelzer) stirrers. Alternatively, the reactor can also be equipped with mixers that operate by the rotor-stator principle or with jet mixers.

Where the premixture is prepared continuously, catalyst solution is, for example, fed continuously to the polyvinyl ester solution outside the extruder, preferably inside a mixing unit, and the premixture so obtained is introduced continuously into the extruder.

Preferred mixing units are passive mixers, such as mixing tubes with static mixing elements (static mixers), for example from Sulzer or Fluitec, or rotor-stator mixers or combinations of the two. Static mixers, such as mixing tubes, are particularly preferred.

The neutralizing agents are generally acidic or basic reagents. The reaction of the polyvinyl esters to polyvinyl alcohols is known to be terminated by adding the neutralizing agents. In the case of acid catalyzed transesterification, preferred neutralizing agents are basic reagents, such as, for example, hydroxides, alcoholates and carbonates of alkali or alkaline earth metals. The hydroxides of lithium, sodium and potassium are preferred; sodium hydroxide is particularly preferred. In the case of alkaline catalyzed transesterification, which is preferred, acidic reagents, such as mineral acids or organic acids, in particular carboxylic acids, are preferred. Preferred acidic reagents have pKa values of less than 7, particularly preferably less than 5. Suitable mineral acids are, for example, hydrochloric acid, nitric acid and preferably sulfuric acid; suitable organic acids are, for example, oxalic acid, formic acid, aliphatic and aromatic sulfonic acids and halocarboxylic acids, such as mono-, di- or tri-chloroacetic acid and preferably acetic acid.

The neutralizing agent can be used in pure form or preferably in the form of a solution in one or more solvents. Particularly suitable solvents are the above-mentioned additives or the above-mentioned alcoholic solvents, in particular methyl acetate and methanol. The neutralizing agent is preferably used in methyl acetate or the alcoholic solvent in which the polyvinyl ester is also used.

The neutralizing agents are preferably used in equimolar amounts to the catalysts. It is also preferred to add an excess of neutralizing agent, for example a 20%, preferably a 10%, molar excess of neutralizing agent, in each case based on the molar amounts of catalyst used. Alternatively, it is also possible to add a deficit of the neutralizing agent, for example a 20%, preferably a 10%, molar deficit of neutralizing agent, in each case based on the molar amounts of catalyst used.

The extruder generally comprises a housing, a drive unit, a plastification unit consisting of one or more rotating shafts (screws) provided with transport and/or kneading elements, and also a control unit. A plurality of zones, preferably including at least one intake zone, at least one reaction zone, a neutralization zone and a discharge zone, conventionally extend along the screw in the transport direction. Each zone can in turn comprise one or more cylinders as the smallest independent unit.

Examples of extruders are single-screw extruders, multi-screw extruders, planetary roller extruders and preferably twin-screw extruders, in particular with a parallel arrangement of the screws, which preferably intermesh. A plurality of screws can be designed to rotate counter-currently or preferably co-currently, to be combing or tightly combing, and can optionally additionally be equipped with kneading disks and/or backfeed elements. For removing solvents, hydrolysis products and/or water, the extruders can be equipped with one or more degassing zones.

Extruders having from 5 to 18, particularly preferably from 10 to 16 and most preferably from 12 to 15 cylinders are preferred. The ratio of the length of the extruder to its diameter is per cylinder preferably from 1 to 10, particularly preferably from 2 to 6 and most preferably 4. In a preferred embodiment, the extruder comprises at least 70% feed elements, based on the length of the screw. Particularly preferably, the extruder comprises solely feed elements, optionally kneading disks, optionally mixing elements or no backfeed elements.

In one embodiment, the extruder can be charged with the alcoholic solution of the polyvinyl esters in a first intake zone and with the alcoholic and/or aqueous solution of the catalyst in a second intake zone. These infeeds can also take place in a common first intake zone. In an alternative embodiment, the above-described premixture comprising the polyvinyl ester and the catalyst is introduced into the extruder via an intake zone.

The reaction of the polyvinyl ester, that is to say the transesterification or the saponification of the polyvinyl ester, generally takes place substantially in a subsequent reaction zone of the extruder. As is known, alkylmonocarboxylic acid esters of the polyvinyl ester are formed in an alcoholysis and monocarboxylic acids of the polyvinyl ester are formed in a hydrolysis (cleavage products). The temperature in the reaction zone is preferably from 20 to 100° C., particularly preferably from 20 to 80° C., yet more preferably from 40 to 75° C. and most preferably from 45 to 75° C.

It is important for the invention that the neutralizing agent is added to the reaction mixture in the extruder. The reaction or transesterification of the polyvinyl esters is thereby already terminated in the extruder and not subsequently in a further device or not outside the extruder. The neutralizing agent is generally introduced into the extruder via one or more further intake zones. These intake zones are situated in the neutralization zone, that is to say spatially behind the reaction zone or downstream of the reaction zone. When the neutralizing agent is added, the reaction mixture has a temperature of preferably from 20 to 150° C., particularly preferably from 40 to 110° C. and most preferably from 45 to 80° C.

At the extruder head, or at the outlet opening or discharge zone of the extruder, that is to say spatially after the neutralization zone, the polyvinyl alcohol can be removed from the extruder and optionally fed to further processing, for example transferred directly into an aqueous polyvinyl alcohol solution.

Particularly preferred extruders have at least the following zones arranged in succession: an intake zone for feeding of the polyvinyl esters or the premixture (1st zone) and optionally an intake zone for the catalyst (2nd zone); mixing zone (3rd zone); reaction zone (4th zone); neutralization zone (5th zone); optional degassing zone with one or more cylinders for degassing at atmospheric pressure and/or in vacuo (6th zone); discharge zone (7th zone), for example in the form of a discharge die, discharge diaphragm or other outlet opening. Extruders that are most preferred have the following zones in the following order: one or two intake zones; mixing zone; reaction zone; neutralization zone and discharge zone. In addition, one or more further zones, such as, for example, mixing zones, heating/cooling zones, degassing zones and/or homogenization zones, can be provided.

The 1st zone is the intake zone for the feeding of the polyvinyl esters that are used or the premixture and generally comprises from 1 to 3, preferably from 2 to 3, cylinders. This zone must be sealed between the screw and the housing with respect to the drive device so that the reagents cannot leave the extruder rearwards. In this 1st zone, the screw used is preferably a double-start screw. This can be assisted by using feed elements in this region of the screw. The first cylinder in the direction of flow is generally closed. The direction of flow here relates to the path of the mass flow starting from the first intake zone (1st zone) via the further zones to the discharge zone (7th zone). Generally, the feed device for charging the extruder with the polyvinyl ester solution or the premixture is situated at the first or second cylinder, in particular at the second cylinder. The polyvinyl ester solution or the premixture is fed, for example, via a metering pump, for example via a piston pump, eccentric screw pump or toothed wheel pump. It has been found to be advantageous to keep all the cylinders of the first intake zone (1st zone) up to and including the cylinder equipped with the feed device at a temperature of ambient temperature or below. A suitable temperature range is, for example, from 10 to 30° C., in particular from 15 to 25° C. To that end, those cylinders can be cooled slightly, for example with cold water. The cylinder following, in the direction of flow, the cylinder equipped with the feed device for the polyvinyl ester solution or the premixture, that is to say, for example, the third cylinder in the direction of flow belonging to the first intake zone (1st zone) or belonging to the second intake zone for the catalyst (2nd zone), is advantageously heated to a temperature in the range of from 30 to 100° C., in particular from 40 to 80° C., yet more preferably from 45 to 75° C. and particularly preferably from 45 to 70° C.

The possible 2nd zone can serve as the intake zone for the catalyst solution and generally comprises a cylinder having a feed device for charging the extruder with the catalyst solution. The screw in this zone can be equipped with mixing elements, for example backmixing elements, in order to ensure thorough mixing of the components. The catalyst solution can be fed by means of a metering pump, for example a piston pump, eccentric screw pump or toothed wheel pump. This feeding can take place, for example, under pressure via a feed nozzle that is closed with respect to the outside. The catalyst solution can optionally be preheated before it is fed in, for example to a temperature in the range of from 30 to 80° C.

The 3rd zone is preferably a mixing zone. This zone generally consists of one cylinder. The screw in this region is equipped with feed elements and optionally with mixing or backmixing elements. The 3rd zone is heated partially or preferably completely to a temperature of from 20 to 150° C., preferably from 40 to 100° C., particularly preferably from 45 to 80° C. and most preferably from 45 to 75° C.

The 4th zone is the actual reaction zone and generally comprises a plurality of closed cylinders, for example from 2 to 15, preferably from 3 to 12 and particularly preferably from 5 to 10 closed cylinders. The screw in this region is advantageously so designed that feed elements alternate with kneading disks. The 4th zone is heated partially or preferably completely to a temperature of from 20 to 150° C., preferably from 40 to 100° C., particularly preferably from 45 to 80° C. and most preferably from 45 to 75° C.

The 5th zone is the neutralization zone and contains the intake zone, in particular a die as the point of addition for the neutralizing agent and generally comprises one or more, in particular one or two, closed cylinders. The screw in this region is advantageously so designed that feed elements alternate with kneading disks. The 5th zone is heated partially or preferably completely to a temperature of from 20 to 150° C., preferably from 40 to 100° C., particularly preferably from 45 to 80° C. and most preferably from 45 to 75° C.

The possible 6th zone is a degassing zone having one or more, for example from one to three, cylinders for degassing at atmospheric pressure and/or in vacuo. The product can be dried in the degassing zone. It has been found to be advantageous to configure the degassing zone in such a manner that it comprises a cylinder with degassing nozzles for degassing at atmospheric pressure, followed by a closed cylinder, and a cylinder equipped with degassing nozzles for degassing in vacuo. The screw is advantageously so designed that it has feed elements in the region of the cylinders equipped with degassing nozzles and kneading disks therebetween, in particular in the region of the closed cylinder. In the degassing zone, substantial portions of the volatile constituents still present, such as solvents, cleavage products and optionally added water with impurities contained therein, can be removed. The gas stream removed in this manner can, for example, be condensed via a condensation unit connected to the extruder and, if desired, fed to further processing or working-up steps, such as separation of the components in distillation columns. The 6th zone is heated partially or preferably completely to a temperature of from 20 to 150° C., preferably from 40 to 100° C., particularly preferably from 45 to 80° C. and most preferably from 45 to 75° C.

There then follows the discharge zone (7th zone). This comprises, for example, a homogenization zone before the actual discharge device. In addition, the forced feeding can be interrupted in order to force a more intensive material exchange. The actual discharge device consists substantially of the extruder head, or the connected discharge die, discharge diaphragm or other outlet opening, for example a round-section die, slot die or perforated diaphragm. The temperature in the discharge zone (including any homogenization zone that is present and the outlet opening) is preferably less than 100° C. Maintenance of the described temperature profile in the various extruder zones is advantageous for controlling the rate of conversion of the polyvinyl esters to polyvinyl alcohol, as well as the product quality.

In order to carry out the method according to the invention, the screws of the extruder are preferably operated at a speed of rotation in the range of from 10 to 1200 rpm, particularly preferably from 25 to 500 rpm, yet more preferably from 30 to 350 rpm and most preferably from 30 to 200 rpm. In general, higher degrees of hydrolysis can be achieved by lower speeds of rotation.

The dwell time of the reaction mixture in the extruder is preferably less than 30 minutes, particularly preferably less than 10 minutes, and/or preferably at least 0.2 minute, particularly preferably at least 0.5 minute, and is in particular in the range of from 0.2 to 5 minutes, particularly preferably from 0.5 to 5 minutes and most preferably from 0.5 to 3 minutes. For example, the dwell time can be adjusted according to the degree of filling with which the extruder is operated. With longer dwell times in the extruder, the degree of hydrolysis of the polyvinyl alcohols can generally also be increased.

The polyvinyl alcohols (extrudate) obtained at the extruder head, or at the outlet opening, are generally obtained in the form of a continuous strand extrudate of preferably constant cross-section, for example in the form of a strip or strand, in particular with a round, oval, rounded or flat and broad cross-section, and can be removed and/or processed further. The extrudate can optionally be fed directly to a use, intermediately stored or subjected to further processing, in particular drying or working up.

The extrudate is generally obtained in the form of a moist powder and can be converted by drying into a granular, in particular pulverulent, form. Powders so obtained are free-flowing.

Working up, if required or desired, can be carried out by established methods. For example, the extrudate can be washed for working up. The extrudate is washed with water, for example, or preferably with one of the alcoholic solvents mentioned above, in particular methanol. The extrudate can thereby be freed of low molecular weight reaction products, for example, in particular of salt-like cleavage products, such as sodium acetate.

Drying preferably does not take place in the extruder. Drying of the extrudate or of the worked-up extrudate preferably takes place outside the extruder in a separate device, for example in a contact dryer, such as thin-film, conical or paddle dryers, which are advantageously operated in vacuo, or in a convective dryer, such as flash tube, cyclone, convex, fluidized bed or rotary dryers. Contact dryers are preferred.

The extrudate can optionally also be concentrated further by pressing or centrifugation.

The extrudate or the extrudate concentrated further by means of pressing or centrifugation can be fed to a further reactor, for example a stirred vessel, in which the volatile constituents, such as residual solvents or cleavage products, are driven off by distillation or by direct steam injection. In the case of distillation, polyvinyl alcohol can be obtained, for example, in granular, in particular pulverulent, form. In the case of steam injection, an aqueous polyvinyl alcohol solution can be obtained by condensation of the injected steam. Additional steps for dissolving solid polyvinyl alcohol can thereby be avoided.

The polyvinyl alcohols can be partially saponified or fully saponified and preferably have a degree of hydrolysis of from 50 to 100 mol. %. Fully saponified polyvinyl alcohols have a degree of hydrolysis of preferably from 96 to 99.9 mol. % and particularly preferably from 98 to 99.5 mol. %. Partially saponified polyvinyl alcohols having a degree of hydrolysis of generally from 70 to 95 mol. %, in particular from 85 to 95 mol. %, are preferred. The degree of hydrolysis denotes, as is conventional, the molar ratio of the vinyl alcohol units and the total sum of the vinyl alcohol and vinyl ester units of the polyvinyl alcohols.

The polyvinyl alcohols have a Happier viscosity of preferably from 0.4 to 60 mPa·s, more preferably from 2 to 60 mPa·s, particularly preferably from 2 to 30 mPa·s and most preferably from 3 to 25 mPa·s (determined by the Happier falling ball method at 20° C. in accordance with DIN 53015 in 4% aqueous solution).

Advantageously, polyvinyl alcohols having uniform saponification numbers and thus having a uniform degree of saponification are obtainable by the method according to the invention. Polyvinyl alcohols having a block structure can be obtained. The individual measures and preferred embodiments of the present invention have been found to be particularly advantageous here, such as the setup of the extruder, dwell times in the extruder, temperatures in the extruder, speeds of rotation, in particular the use of the polyvinyl ester and of the catalyst in the form of a premixture and, above all, the addition of the neutralizing agent in the extruder. Surprisingly, no significant diffusion of the neutralizing agent from the neutralization zone into the reaction zone occurred, which would have led to inhomogeneous or incomplete saponification reactions.

The method according to the invention is highly suitable both for large-scale reactions and for batches in quantities which are small, and it is thus flexible in terms of use. Polyvinyl alcohols having very different degrees of saponification and viscosities are obtainable. The reaction procedure is simple and can be varied. Established equipment is used. The transesterification of polyvinyl esters, the neutralization and optionally drying can be carried out in a single device. It is possible to dispense completely with additional solvent for neutralizing the saponification product, and the neutralization nevertheless takes place quickly and in a controlled manner. The expensive and laborious comminution or dissolution of the saponification product before the neutralization can thus be omitted in the case of the procedure according to the invention.

The polyvinyl alcohols are suitable as a protective colloid for the emulsion polymerization of ethylenically unsaturated monomers or as a starting material for the production of polyvinylbutyral. The polyvinyl alcohols can likewise be used as a material in the production of fibers, adhesives, textile warp sizing, paper sizing or in the coating of paper.

The examples which follow serve to explain the invention further.

Setup of the Extruder:

A ZSE27 twin-screw extruder from Leistritz having 13 cylinders and a discharge die was used. The extruder had the following zones:

1st zone: intake zone for the polyvinyl ester solution or the premixture;
2nd zone: intake zone for the catalyst;
3rd zone: mixing zone;
4th zone: reaction zone;
5th zone: neutralization zone;
6th zone: degassing zone for degassing in vacuo;
7th zone: discharge zone in the form of a discharge die.

Determination of the Höppler Viscosity:

For polyvinyl acetate, the Höppler viscosity was determined at 20° C. in accordance with DIN 53015 in 10% ethyl acetate solution.

For polyvinyl alcohol, the Höppler viscosity was determined at 20° C. in accordance with DIN 53015 in 4% aqueous solution.

Brookfield Viscosity:

The Brookfield viscosities of the solutions of polyvinyl acetate in methanol were determined using a Brookfield viscometer, after adjustment to a temperature of 23° C., using spindle 1 or 2, at 20 revolutions per minute. The spindles, solvents and solids content used in a given case are indicated for the measurement in question.

Determination of the Molecular Weight Mw and of the Molecular Weight Mn:

The weight-average molecular weight Mw and the number-average molecular weight Mn of the polyvinyl alcohols were determined by means of size exclusion chromatography (SEC) against polyethylene oxide standard 22000, in 100 mmol/l of sodium nitrate with 10% acetonitrile, at 40° C., flow rate 1.0 ml/min and triple detection (small angle light scattering detector, refractive index detector and viscometry detector from Malvern-Viscotek) on an Ultrahydrogel 1000, 500, 250 column set from Waters Corp. USA with an injection volume of 100 µl.

Example 1

Polyvinyl acetate (Höppler viscosity: 4.2 mPa·s) in the form of a methanolic solution was fed continuously at room temperature by means of a metering pump into the above-described extruder via the intake nozzle of the first intake zone (1st zone).

A 5% by weight methanolic sodium hydroxide solution was metered in continuously via the second intake zone (2nd zone) in such a manner that the amount of sodium hydroxide used, based on the dry weight of the polyvinyl acetate used, was 1.9% by weight.

A 30% by weight solution of acetic acid in methyl acetate was continuously metered into the 5th zone by means of a metering pump. The amount was so chosen that a 10% molar excess of acetic acid was achieved, based on the sodium hydroxide used.

The second intake zone (2nd zone) was adjusted to a temperature of 25° C. Cylinders 3 to 13 (3rd to 7th zone) were adjusted to a temperature of 65° C.

The speed of rotation of the screws was 300 rpm.

A polyvinyl alcohol having the following features was obtained: degree of hydrolysis of 88.5 mol. %, Höppler viscosity of 3.7 mPa·s, number-average molecular weight Mn of 12 700 g/mol, weight-average molecular weight Mw of 27 960 g/mol, and an inhomogeneity Mw/Mn of 2.3.

Example 2

A static mixer from Fluitec having mixing elements of type CSE-X was connected as a mixing unit upstream of the extruder described at the beginning. Polyvinyl acetate (Höppler viscosity: 4.2 mPa·s) in the form of a methanolic solution was introduced into the static mixer via a metering pump, and a 5% by weight methanolic sodium hydroxide solution was introduced via a Fluitec injection point. The amount of sodium hydroxide used was 1.9% by weight, based on the dry weight of the polyvinyl acetate used. A methanolic premixture of polyvinyl acetate and sodium hydroxide was produced continuously by means of the mixing unit.

The premixture was fed continuously into the second intake zone (2nd zone) of the extruder at room temperature by means of a metering pump.

Cylinders 3 to 13 (3rd to 7th zone) were adjusted to a temperature of 60° C.

The speed of rotation of the screws was 200 rpm.
Acetic acid was added as described in Example 1.
A polyvinyl alcohol having a degree of hydrolysis of 87.6 mol. % and a Höppler viscosity of 3.9 mPa·s was obtained.

Example 3

The procedure was analogous to Example 2, with the following differences: the temperature in cylinders 3 to 13 (3rd to 7th zone) was 55° C., and the speed of rotation of the screws was reduced to 100 rpm.

A polyvinyl alcohol having a degree of hydrolysis of 89.2 mol. % and a Höppler viscosity of 3.8 mPa·s was obtained.

Example 4

The procedure was analogous to Example 2, with the following differences: the temperature in cylinders 3 to 13 (3rd to 7th zone) was 50° C., the speed of rotation of the screws was 50 rpm, and 1.1% by weight sodium hydroxide were used, based on the dry weight of the polyvinyl acetate used.

A polyvinyl alcohol having a degree of hydrolysis of 88.3 mol. % and a Höppler viscosity of 3.9 mPa·s was obtained.

Example 5

The procedure was analogous to Example 3, but the polyvinyl acetate used had a Höppler viscosity of 5.2 mPa·s.

A polyvinyl alcohol having a degree of hydrolysis of 88.8 mol. % and a Höppler viscosity of 4.4 mPa·s was obtained.

Example 6

The procedure was analogous to Example 5, but the polyvinyl acetate used had a Höppler viscosity of 13.7 mPa·s.

A polyvinyl alcohol having a degree of hydrolysis of 87.2 mol. % and a Höppler viscosity of 9.3 mPa·s was obtained.

Example 7

The procedure was analogous to Example 5, but the polyvinyl acetate used had a Höppler viscosity of 79.6 mPa·s.

A polyvinyl alcohol having a degree of hydrolysis of 86.3 mol. % and a Höppler viscosity of 26.0 mPa·s was obtained.

Example 8

The procedure was analogous to Example 3, but instead of the methanolic polyvinyl acetate solution a corresponding solution of a vinyl acetate-VeoVa10 copolymer (1% by weight VeoVa10; VeoVa10 is the vinyl ester of versatic acid 10; Höppler viscosity: 4.2 mPa·s) was used.

A polyvinyl alcohol having a degree of hydrolysis of 88.8 mol. % and a Höppler viscosity of 4.0 mPa·s was obtained.

Example 9

The procedure was analogous to Example 3, but with a temperature in cylinders 3 to 13 (3rd to 7th zone) of 65° C.

A polyvinyl alcohol having a degree of hydrolysis of 95.2 mol. % and a Höppler viscosity of 3.8 mPa·s was obtained.

Example 10

The procedure was analogous to Example 9, but with a temperature in cylinders 3 to 13 (3rd to 7th zone) of 75° C.

A polyvinyl alcohol having a degree of hydrolysis of 98.3 mol. % and a Höppler viscosity of 3.7 mPa·s was obtained.

Example 11

The procedure was analogous to Example 6, with the following differences: the temperature in cylinders 3 to 13 (3rd to 7th zone) was 50° C., the speed of rotation of the screws was 80 rpm, and 2.1% by weight sodium hydroxide was used, based on the dry weight of the polyvinyl acetate used.

A polyvinyl alcohol having a degree of hydrolysis of 97.3 mol. % and a Höppler viscosity of 9.2 mPa·s was obtained.

Example 12

The procedure was analogous to Example 4, with the following differences: a 5% by weight sodium methanolate solution in methanol and, based on the dry weight of the polyvinyl acetate used, 1.1% by weight sodium methanolate were used.

A polyvinyl alcohol having a degree of hydrolysis of 88.8 mol. % and a Höppler viscosity of 4.0 mPa·s was obtained.

Example 13

The procedure was analogous to Example 8, but instead of the methanolic polyvinyl acetate solution a corresponding solution of a vinyl acetate-isopropenyl acetate copolymer (20% by weight isopropenyl acetate; Höppler viscosity: 2.2 mPa·s) was used. A polyvinyl alcohol having a degree of hydrolysis of 97.4 mol. % and a Höppler viscosity of 2.4 mPa·s was obtained.

Comparative Example 14

The procedure was analogous to Example 4, but no acetic acid solution was metered into the extruder. Instead, the crude product leaving the discharge zone of the extruder (7th zone) was guided into a container in which a 30 wt % solution of acetic acid in methyl acetate in 10% molar excess of the amount needed to neutralize the sodium hydroxide solution had been placed, and the mixture was stirred.

The resulting polyvinyl alcohol had a degree of hydrolysis of 89.4 mol. % and a Höppler viscosity of 3.9 mPa·s.

The examples show that both partially saponified and fully saponified, or low viscosity or high viscosity, polyvinyl alcohols, as well as modified and unmodified polyvinyl alcohols can purposively be produced by means of the method according to the invention. The method according to the invention thus opens up a very flexible, purposive means of obtaining polyvinyl alcohols having very different physical or chemical properties.

Saponification Number Distribution:

The saponification number distribution of the polyvinyl alcohols was determined on the basis of publications of Loughborough University in collaboration with Polymer Laboratories (E. Meehan, S. P. Reid, E. Samios, J. V. Dawkins, Macromol. Symp. 110, 65-80 (1996) and J. V. Dawkins, T. A. Nicholson, A. J. Handley, E. Meehan, A. Nevin, P. L. Shaw, Polymer 40, 7331-7339 (1999)) by reversed phase gradient HPLC. The carrier material used was a large-pore, polymeric reversed phase material based on styrene/p-divinylbenzene from Polymer Laboratories (PLRP-S 4000 Å, 8 µm, 50×4.6 mm column). A methanol/water gradient with increasing methanol content was used as the eluent. An evaporative light scattering detector was used for the detection, the signal intensity of which is given in mV and correlates with the number of polyvinyl alcohols having a particular degree of hydrolysis. With shorter retention times, polyvinyl alcohol fractions having higher degrees of hydrolysis are eluted, gradually followed by the polyvinyl alcohol fractions having falling degrees of hydrolysis.

The drawing shows by way of example the saponification number distributions so obtained for the polyvinyl alcohols of Comparative Example 14 and of Examples 3, 4 and 5. The signal at a retention time of about 0.5 minute originates from sodium acetate.

A retention time of about 7 minutes corresponds to a degree of hydrolysis of 88 mol. %. The range below 5 minutes corresponds to degrees of hydrolysis of from 90 to 100 mol. %. The shorter the retention time, the more highly saponified the detected polyvinyl alcohol.

The drawing shows that, by stopping the saponification reaction outside the extruder, polyvinyl alcohols having very inhomogeneous degrees of hydrolysis were obtained, which even show two maxima for species having different degrees of saponification (drawing: Comparative Example 14). Polyvinyl alcohols having such inhomogeneous degrees of hydrolysis have disadvantageous application-related properties and, when used, for example, as a protective colloid for the emulsion polymerization of ethylenically unsaturated monomers, exhibit a far less effective action as a protective colloid than do the polyvinyl alcohols produced according to the invention.

The invention claimed is:

1. A method for producing polyvinyl alcohols comprising catalytic reaction of alcoholic polyvinyl ester solutions in extruders, wherein the polyvinyl esters are based solely on ethylenically unsaturated monomers and the polyvinyl ester solutions do not comprise polyvinyl esters containing a polyether unit or a polyether group, wherein one or more neutralizing agents are added to the product of the catalytic reaction while said product is still in the extruder, and wherein the polyvinyl alcohols are partially or fully saponified, have a degree of hydrolysis from 70 to 99.5 mol. %, and have only one distinct maximum in a saponification number distribution reversed phase gradient HPLC trace.

2. The method for producing polyvinyl alcohols as claimed in claim 1, wherein the polyvinyl esters are homopolymers or copolymers of one or more vinyl esters of aliphatic carboxylic acids having from 1 to 13 carbon atoms and optionally up to 50% by weight of one or more comonomers selected from the group consisting of olefins, acrylic acid esters or methacrylic acid esters of unbranched or branched alcohols having from 1 to 22 carbon atoms, isopropenyl acetate, N-vinylpyrrolidone, N-vinylcaprolactam, vinyl formamide, ethylenically unsaturated mono- and di-carboxylic acids, maleic anhydride and ethylenically unsaturated carboxylic acid amides.

3. The method for producing polyvinyl alcohols as claimed in claim 1, wherein the content of polyvinyl ester in an alcoholic polyvinyl ester solution in which the catalytic reaction takes place is from 20 to 80% by weight.

4. The method for producing polyvinyl alcohols as claimed in claim 1, wherein the catalytic reaction of the alcoholic polyvinyl ester solutions takes place in the presence of one or more acidic or alkaline catalysts.

5. The method for producing polyvinyl alcohols as claimed in claim 1, wherein one or more polyvinyl esters and one or more catalysts are introduced in the form of a premixture into an extruder.

6. The method for producing polyvinyl alcohols as claimed in claim 1, wherein the extruder comprises from 5 to 18 cylinders.

7. The method for producing polyvinyl alcohols as claimed in claim 1, wherein the extruder comprises feed elements, optionally kneading disks and optionally mixing elements, but no backfeed elements.

8. The method for producing polyvinyl alcohols as claimed in claim 1, wherein the extruder comprises the following zones in the following order:
an intake zone for feeding of the polyvinyl esters, or a premixture of one or more polyvinyl esters and one or more catalysts (1st zone); optionally an intake zone for the catalyst (2nd zone); mixing zone (3rd zone); reaction zone (4th zone); neutralization zone (5th zone); optional degassing zone (6th zone); and discharge zone (7th zone).

9. The method for producing polyvinyl alcohols as claimed in claim 1, wherein the extruder comprises one or more screws and the screws are operated at a speed of rotation of from 10 to 1200 revolutions per minute.

10. The method for producing polyvinyl alcohols as claimed in claim 1, wherein the dwell time of the reaction mixture in the extruder is from 0.2 to 5 minutes.

11. The method for producing polyvinyl alcohols as claimed in claim 1, wherein the polyvinyl ester solutions do not comprise polyvinyl esters that are graft copolymers.

12. The method for producing polyvinyl alcohols as claimed in claim 1, wherein the polyvinyl alcohols have a degree of hydrolysis from 70 to 95 mol. %.

13. The method for producing polyvinyl alcohols as claimed in claim 1, wherein the polyvinyl alcohols have a degree of hydrolysis from 85 to 95 mol. %.

* * * * *